No. 661,791. Patented Nov. 13, 1900.
F. J. CHRIST.
MUSIC LEAF TURNER.
(Application filed Sept. 16, 1899.)
(No Model.) 2 Sheets—Sheet 1.
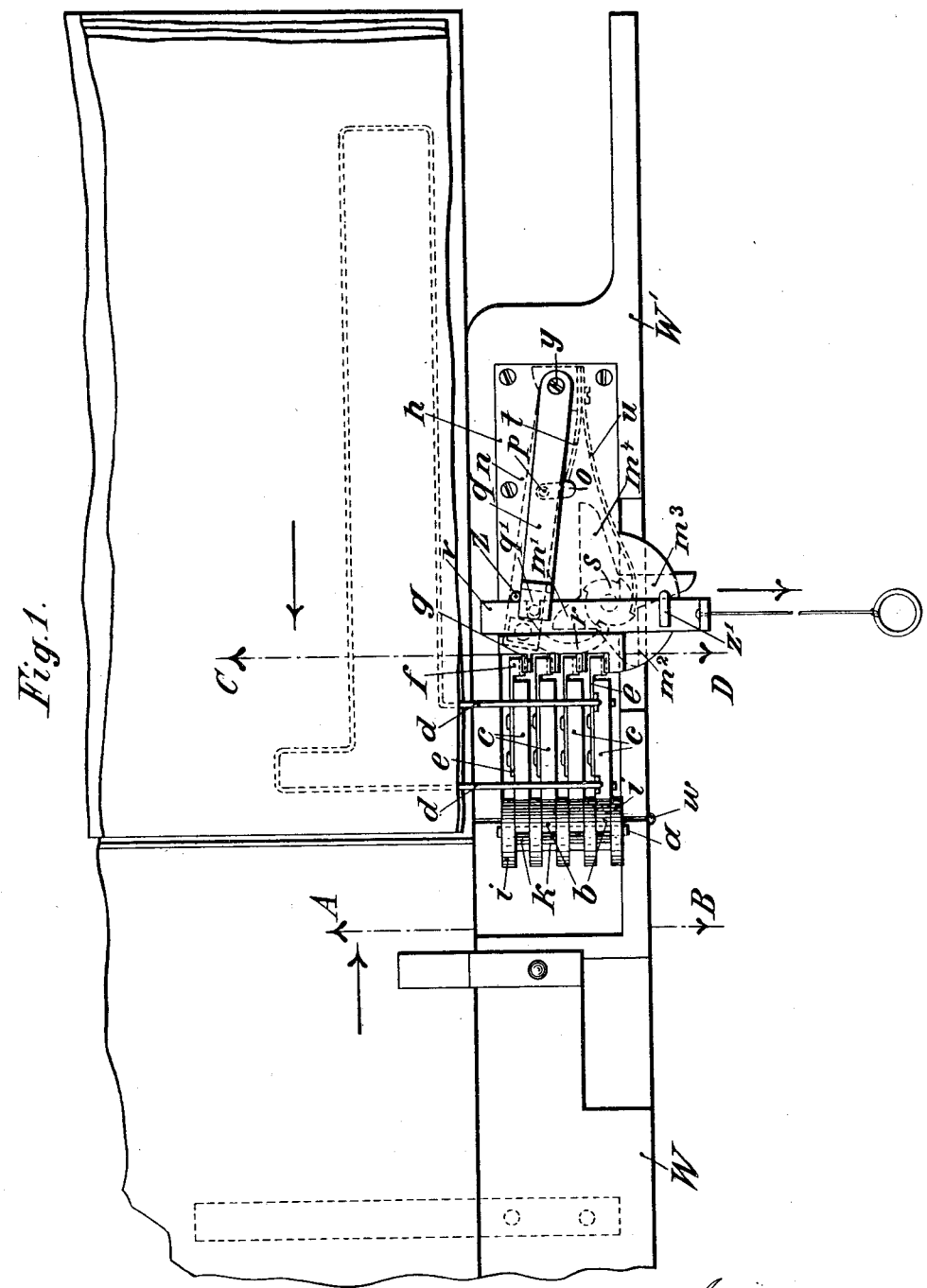

No. 661,791. Patented Nov. 13, 1900.
F. J. CHRIST.
MUSIC LEAF TURNER.
(Application filed Sept. 16, 1899.)
(No Model.) 2 Sheets—Sheet 2.
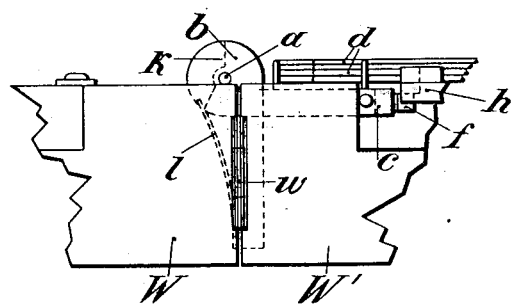
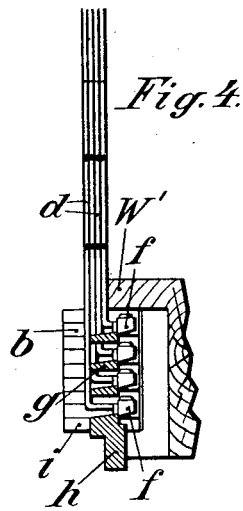
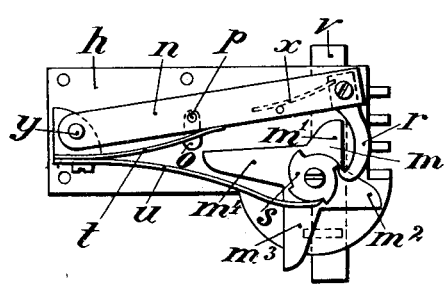
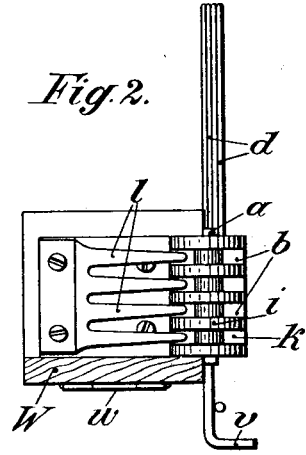
Witnesses
M. Wheddon
O. F. Sonnek
Inventor
Franz Josef Christ
by
Attys.

UNITED STATES PATENT OFFICE.

FRANZ JOSEF CHRIST, OF BERLIN, GERMANY.

MUSIC-LEAF TURNER.

SPECIFICATION forming part of Letters Patent No. 661,791, dated November 13, 1900.

Application filed September 16, 1899. Serial No. 730,714. (No model.)

*To all whom it may concern:*

Be it known that I, FRANZ JOSEF CHRIST, mechanician, a subject of the Emperor of Germany, residing at Fürbringerstrasse 35, Berlin, in the Kingdom of Prussia and Empire of Germany, have invented certain new and useful Improvements in Leaf-Turners for Sheet-Music and the Like, of which the following is a full, clear, and exact description.

The subject of the present invention is a leaf-turner by which the leaves of sheet-music or the like may be turned singly by means of mechanically-actuated wire hoops placed behind the leaves.

In the accompanying drawings the leaf-turner is illustrated with four hoops.

Figure 1 shows a front view of the device with the hoops placed behind the single leaves and ready for operation. Fig. 2 is a vertical cross-section on the line A B, Fig. 1. Fig. 3 is a view from below of the center part of the device. Fig. 4 is a cross-section on the line C D, Fig. 1. Fig. 5 is a rear view of the plate carrying the unlocking mechanism for the hoops.

A shaft $a$ is mounted on one of two strips of wood W W, connected together by means of a hinge $w$ and forming the lower part of a sheet-music support. The disks $b$ are rotatable on said shaft. These disks carry arms $c$, to which are connected the hoops $d$, made of wire or similar material. Spring-blades $e$ are fastened to the arms $c$, projecting from the free ends of the same and provided with blocks $f$, which are beveled, as shown in Fig. 4. These blocks $f$ may be locked behind noses $g$, fixed at suitable distances on a plate $h$, which is countersunk into the wooden frame W'. These noses $g$ are also wedge-shaped or beveled, as clearly seen in Fig. 4. The blocks $f$ on the springs $e$ on account of the elasticity of the latter catch behind the noses $g$ of plate $h$ and are held in this position until released. The cam-disks $b$ on shaft $a$ are separated by interposed circular washers $i$ and are cut off or provided with recesses $k$ on the side opposite to the levers $c$, as clearly shown in Fig. 1 and in dotted lines in Fig. 3. Springs $l$, engaging into these recesses $k$ and pressing against one of their edges, cause the turning of the respective disks $b$, carrying the arms $c$ and hoops $d$, one hundred and eighty degrees as soon as the blocks $f$ are released and after this operation retain the disks $b$ and arms $c$ and hoops $d$ in their new position—*i. e.*, with the hoops and the leaves turned over—by pressing against the upper edge of recess $k$. (Shown in Fig. 3.) Another function of springs $l$ is to press the blocks $f$ against the rear face of the noses $g$. To permit rotation of the disks $b$, the blocks $f$ must first be released. This is accomplished by a star-wheel $m$, having four teeth $m'$ $m^2$ $m^3$ $m^4$ of different length, which wheel is pivoted on the off side of the plate $h$.

Fastened to the star-wheel $m$ and rotating therewith on the same axle is a ratchet-wheel $s$, Fig. 5, having teeth into which engage a pawl $r$ and a spring-detent $u$. The pawl $r$ is pivoted to a lever $n$ and held by a spring $x$ in engagement with the ratchet-wheel $s$. The lever $n$ turns on a pin $y$ on the off side of the plate $h$ and is pressed by a spring $t$, so as to tend to rotate the ratchet-wheel $s$. The spring $u$, also located on the off side of plate $h$, holds the ratchet-wheel $s$, and therefore also the star-wheel $m$, against backward rotation.

The change of position is accomplished as follows: On the front side of plate $h$ there is provided a second lever $q$, rotatable on the pin $y$, which lever $q$ is connected to the other lever $n$ by means of a pin $p$, extending through a slot $o$ in the plate $h$, and therefore transmits its motion to the same. The free end of lever $q$ is connected to a slide $v$, which has a notch for a pin $q'$ at the end of the lever $q$, as shown in dotted lines in Fig. 1. This slide $v$ moves on the front side of plate $h$ and is confined and guided by a fixed stud $z$, and the parts $g$ of plate $h$, and a guide-piece $z'$. The lower end of said slide $v$ is bent at right angles, as shown in Fig. 2. A pull in the direction of the arrow, as shown in Fig. 1, produced, for instance, in any suitable way, either by hand or by means of a cord connected to the slide $v$ and operated by the foot in a stirrup, will move the slide $v$ downwardly. The front lever $q$ will transmit this motion to the rear lever $n$ and its pawl $r$, which thereby will be pushed over the next tooth of cam-wheel $s$. On releasing the slide $v$ the spring $t$ will push this slide, as well as the two levers $q$ and $r$, in an upward direction until the lever $q$ strikes the pin $z$, and the clutch $r$ will turn the cam-wheel $s$ and also the star-wheel $m$ ninety degrees, in which position it will be locked against backward rotation by the spring $u$. One of the teeth $m'$ $m^2$ $m^3$ $m^4$ strikes against one of the spring-blocks $f$ and presses the same away from the corresponding nose $g$ of the plate $h$, so that the action of the spring $l$ will turn one of the disks $b$ and its lever $c$ and one of the hoops $d$, carrying the respective music-leaves. The operation of the disks $b$ $c$ starts with the lower one, as the teeth $m'$ $m^2$ $m^3$ $m^4$ are of such different length as to operate successively upon the different blocks $f$.

The following is what I claim as new and desire to secure by Letters Patent:

1. A leaf-turner comprising any desirable number of levers $c$ fulcrumed on a shaft $a$ and having arms $d$ to carry the respective leaves; detent-springs $e$ on said levers, noses $g$ with which the detent-springs engage when the levers are turned to normal position, a star-wheel $m$, engaging successively with the springs $e$ to discharge them from their retaining-noses $g$, means for imparting step-by-step rotation to the star-wheel and springs $l$ to effect the rotation of the levers when the latter are released, substantially as described.

2. The combination of the levers $c$ fulcrumed on a common shaft, leaf-turning arms $d$ carried thereby, detaining-springs $e$ on the levers carrying beveled blocks $f$, noses $g$ with which the blocks $f$ engage, a star-wheel $m$ having teeth of unequal length to engage successively with the blocks $f$ and discharge the same by rotation of the star-wheel, means for imparting step-by-step rotation to the star-wheel and suitable springs imparting movement to the levers when the latter are released substantially as explained.

3. The combination of the levers $c$ fulcrumed on a common shaft $a$, leaf-turning arms $d$, carried by said levers detaining-blocks $f$ connected by springs $e$ to the levers, noses $g$ with which the blocks engage, the star-wheel $m$ having teeth $m'$, $m^2$, $m^3$, $m^4$ of successively greater length adapted to discharge the blocks $f$ successively from the noses $g$ when the star-wheel is rotated, the lever $n$, pawl $r$ spring $t$ ratchet-wheel $s$ and a slide $e$ suitably connected to the lever $n$ to impart movement thereto and thereby impart step-by-step rotation to the star-wheel, and suitable springs $l$ acting on the hubs of the levers and turning said levers when they are released.

4. In combination with levers $c$, leaf-turning arms $d$ carried thereby, detaining-springs $e$ and blocks $f$ on the levers, noses $g$ with which they are engaged, and suitable springs for turning the levers when released; the star-wheel $m$ having teeth of unequal length and slide $e$ connected levers $n$ $q$, springs $t$, $u$, pawl $r$ and ratchet-wheel $s$ for imparting step-by-step rotation to the star-wheel substantially as described.

In witness whereof I subscribe my signature in presence of two witnesses.

FRANZ JOSEF CHRIST.

Witnesses:
HENRY HASPER,
WOLDEMAR HAUPT.